ми
United States Patent [19]
Mizutani

[11] Patent Number: 6,092,954
[45] Date of Patent: Jul. 25, 2000

[54] BALL JOINT

[75] Inventor: Masayuki Mizutani, Hamamatsu, Japan

[73] Assignee: Kabushiki Kaisha Somic Ishikawa, Japan

[21] Appl. No.: 09/188,392

[22] Filed: Nov. 10, 1998

[30] Foreign Application Priority Data

Nov. 11, 1997 [JP] Japan .................................. 9-308976

[51] Int. Cl.[7] .................................................. F16C 11/00
[52] U.S. Cl. ........................ 403/140; 403/132; 403/133
[58] Field of Search .................................. 403/140, 134, 403/122, 135, 138, 133, 132

[56] References Cited

U.S. PATENT DOCUMENTS

| | | | |
|---|---|---|---|
| 4,353,660 | 10/1982 | Parks | 403/132 |
| 4,564,307 | 1/1986 | Ito | 403/140 |
| 4,755,078 | 7/1988 | Blumberg et al. | 403/134 |
| 4,875,794 | 10/1989 | Kern, Jr. | 403/132 |
| 5,188,476 | 2/1993 | Mori | 403/132 |
| 5,188,477 | 2/1993 | Idosaka et al. | 403/132 |
| 5,368,408 | 11/1994 | Shimizu et al. | 403/140 |
| 5,395,176 | 3/1995 | Zivkovic | 403/122 |
| 5,509,748 | 4/1996 | Idosako et al. | 403/122 |
| 5,772,337 | 6/1998 | Maughan et al. | 384/206 |

*Primary Examiner*—Terry Lee Melius
*Assistant Examiner*—David E. Bochna
*Attorney, Agent, or Firm*—Morrison Law Firm

[57] ABSTRACT

A bearing seat slidably supports a ball head of a ball stud in a housing. Circumferentially spaced-apart load bearing ribs on the outer surface of the bearing seat facing the housing support the load placed on the joint. Auxiliary load bearing ribs, between adjacent ones of the load bearing ribs, extend from the surface of the ball joint seat slightly less farther than the load bearing ribs. The auxiliary load bearing ribs come into supportive contact with the housing when subjected to heavier loads, to prevent excessive stress flexure of the bearing seat. The ability of the ball joint to absorb repeated heavy load applications while maintaining friction compensation and a stable torque without stress cracking is improved. The ball joint has an improved ability to compensate for dimensional tolerances, which facilitates component manufacture. The load withstanding ability and the durability of the ball joint are thus improved without an increase in size or cost.

8 Claims, 6 Drawing Sheets

BALL JOINT

BACKGROUND OF THE INVENTION

The present invention relates to a ball joint bearing seat that envelops a ball head portion of a ball stud in such a way as to permit the ball head portion to slide therein.

Referring to FIGS. 8 and 9, a prior art ball joint typically has a plurality of load receiving ribs 44, 44 radially arranged on the outer surface of a bearing seat 43 that faces a bottom portion 42 of a housing 41. The bearing seat 43 and a ball head portion 45 of a ball stud are installed in the housing 41. The bearing seat 43 envelops the ball head portion 45 with the ends of the load receiving ribs 44, 44 in contact with the bottom portion 42. The load receiving ribs 44, 44 themselves are spaced apart from each other.

The load receiving ribs 44, 44 contact the housing 41 to enable smooth operation with stable operation torque by absorbing dimensional tolerances of the components. A load applied to the ball stud is supported by the load receiving ribs 44, 44. Flexure of the portions of bearing seat 43 located in between the receiving ribs 44, 44 releases support for the applied load. Thus, the above configuration gives the ball joint the ability to withstand loading and provides friction compensation.

However, when a heavy load is repeatedly applied to the ball stud of a ball joint that uses a bearing seat as shown in FIGS. 8 and 9, inevitable fatigue of the load receiving ribs 44, 44 causes the portions of the bearing seat 43 between the load receiving ribs 44, 44 to flex to a greater extent, thereby generating a great tensile stress on the inner surface of the bearing seat 43, i.e. the surface on which the bearing seat 43 contacts the ball head portion 45 of the ball stud. In the end, such stress may cause fatigue breakage of the bearing seat 43.

OBJECTS AND SUMMARY OF THE INVENTION

In order to solve the above problem, it is an object of the present invention to provide a ball joint having a greater ability to withstand load without increasing the size of the ball joint.

It is a further object of the invention to provide a bearing seat for a ball joint which absorbs dimensional tolerances while providing friction compensation and a stabilized torque.

Briefly stated, the present invention provides a bearing seat that slidably supports a ball head of a ball stud in a housing. Circumferentially spaced-apart load bearing ribs on the outer surface of the bearing seat facing the housing support the load placed on the joint. Auxiliary load bearing ribs, between adjacent ones of the load bearing ribs, extend from the surface of the ball joint seat slightly less farther than the load bearing ribs. The auxiliary load bearing ribs come into supportive contact with the housing when subjected to heavier loads, to prevent excessive stress flexure of the bearing seat. The ability of the ball joint to absorb repeated heavy load applications while maintaining friction compensation and a stable torque without stress cracking is improved. The ball joint has an improved ability to compensate for dimensional tolerances, which facilitates component manufacture. The load withstanding ability and the durability of the ball joint are thus improved without an increase in size or cost.

According to an embodiment of the invention, there is provided a balljoint comprising: a housing having an inner chamber therein, an opening leading to the inner chamber in the housing, a bottom portion located opposite the opening, a bearing seat adapted to be disposed in the inner chamber, an opening and a bottom portion in the bearing seat, an outer portion of the bearing seat including a cylindrical portion near the opening at a first end of the bearing seat, and a generally conical portion near the bottom portion of the bearing seat, a first plurality of load bearing receiving ribs formed on at least an outer surface of the conical portion, the first plurality extending outward a first distance from the outer surface of the conical portion, adjacent ones of the first plurality being spaced a substantial distance apart, a second plurality of auxiliary load receiving ribs extending outward a second distance from the outer surface of the conical portion, each of the auxiliary load receiving ribs being disposed between adjacent ones of the load receiving ribs, the second distance being less than the first distance, the bearing seat being of a material having a resilience sufficient to permit the bearing seat to elastically flex and the receiving ribs to elastically compress such that the auxiliary receiving ribs are brought into supportive contact with the inner chamber when heavily loaded, a ball stud having a ball head portion adapted to be slidably enveloped in the bearing seat, the ball stud further including a stud portion integrally formed with the ball head portion, and the stud portion projecting from the bearing seat.

According to a feature of the invention, there is provided a bearing seat comprising: an opening and a bottom portion in the bearing seat, an outer portion of the bearing seat including a cylindrical portion near the opening at a first end of the bearing seat, and a generally conical portion near the bottom portion of the bearing seat, a first plurality of load bearing receiving ribs formed on at least an outer surface of the conical portion, the first plurality extending outward a first distance from the outer surface of the conical portion, adjacent ones of the first plurality being spaced a substantial distance apart, a second plurality of auxiliary load receiving ribs extending outward a second distance from the outer surface of the conical portion, each of the auxiliary load receiving ribs being disposed between adjacent ones of the load receiving ribs, the second distance being less than the first plurality, and the bearing seat being of a material having a resilience sufficient to permit the bearing seat to elastically flex and the receiving ribs to elastically compress such that the auxiliary receiving ribs are brought into supportive contact with the inner chamber when heavily loaded.

According to an embodiment, the invention provides a housing having an opening and an inner chamber which has the bottom portion located opposite the opening. A ball stud having a ball head portion is disposed in the inner chamber of the housing. A stud portion is integrally formed with the ball head portion. The stud portion projects from the opening. A bearing seat, which is composed of a material exhibiting both rigidity and flexibility, such as a synthetic resin, is located in the inner chamber of the housing. The bearing seat envelops the ball head portion of the ball stud in a slidable fashion when the ball stud is inserted through the insertion hole of the bearing seat. The bearing seat includes a plurality of load receiving ribs extending from the surface of the bearing seat that contacts the bottom portion of the housing. The bearing seat also includes a plurality of auxiliary load receiving ribs that extend slightly less far, and are alternately arranged with, the load receiving ribs. The load receiving ribs are also radially arranged with their outer faces contacting the bottom portion of the housing. At least one auxiliary load receiving rib is formed between each adjacent pair of load receiving ribs.

The configuration described above distributes a load applied to the ball joint over an area extending in the circumferential direction. In cases where a relatively light load is applied to the ball stud, flexure of the portions between the load receiving ribs supports the light load. When a heavy load is applied, the load receiving ribs are compressed to bring the outer faces of the auxiliary load receiving ribs into contact with the bottom portion of the housing to aid in supporting the applied load. By preventing excessive flexure of the bearing seat, the above configuration prevents fatigue breakage, increases the load withstanding ability and provides stable friction compensation. In addition, dimensional tolerances of the components can be absorbed by the load receiving ribs so that smooth operation with a stable operation torque is ensured.

The auxiliary load receiving ribs in the ball joint of the above invention may be arranged radially. When the auxiliary load receiving ribs are arranged radially, a ball joint of the invention has a simple configuration wherein the auxiliary load receiving ribs can easily be formed.

The auxiliary load receiving ribs may also be configured to extend in the circumferential direction. This configuration allows the auxiliary load receiving ribs to remain continuously in contact with the seating face of the bottom portion of the housing. The gaps between load receiving ribs and auxiliary load receiving ribs that are provided in other configurations are thus eliminated. A ball joint with this configuration therefore prevents excessive flexure in a more reliable fashion.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
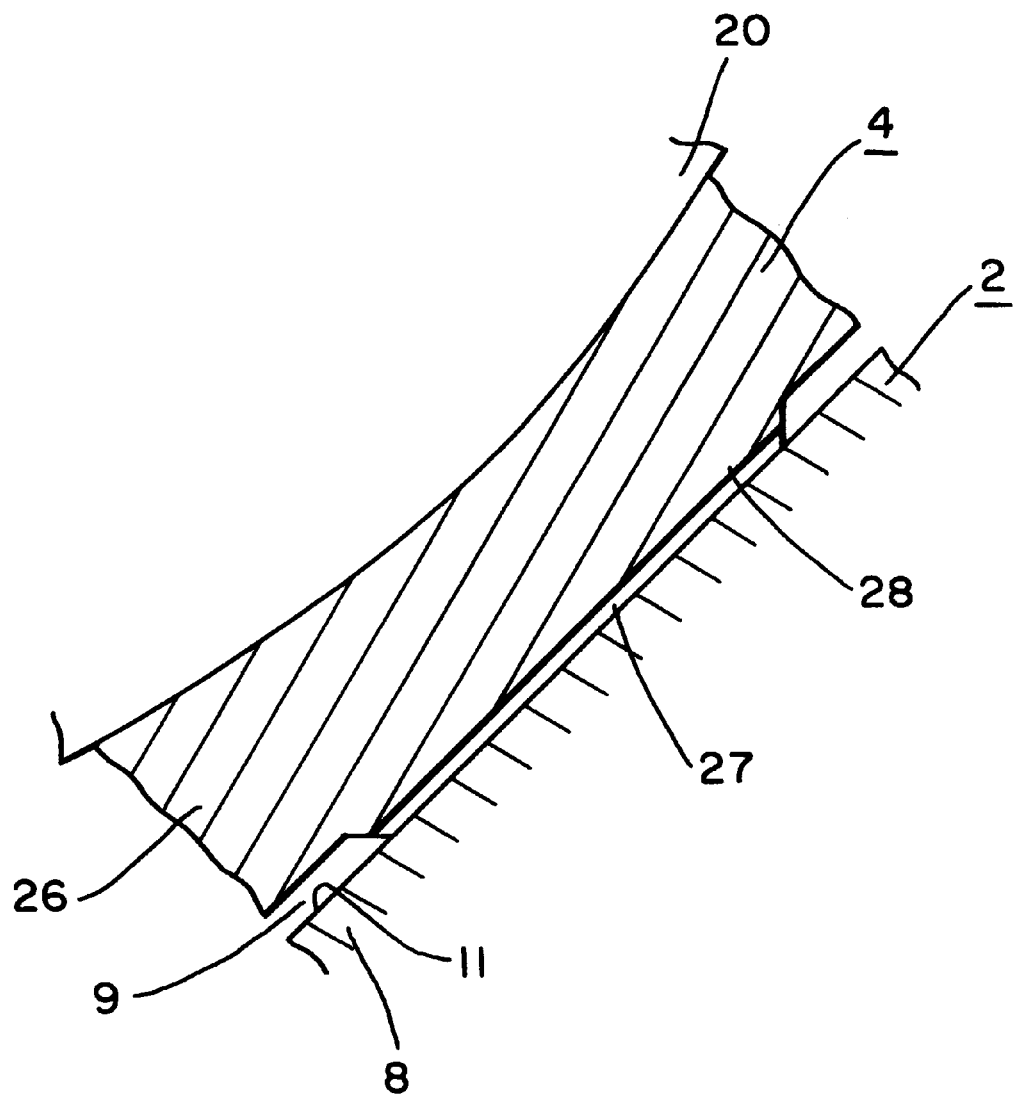
FIG. 1 is a sectional view of the region of the load receiving ribs of a ball joint according to an embodiment of the present invention.
Figure 2:
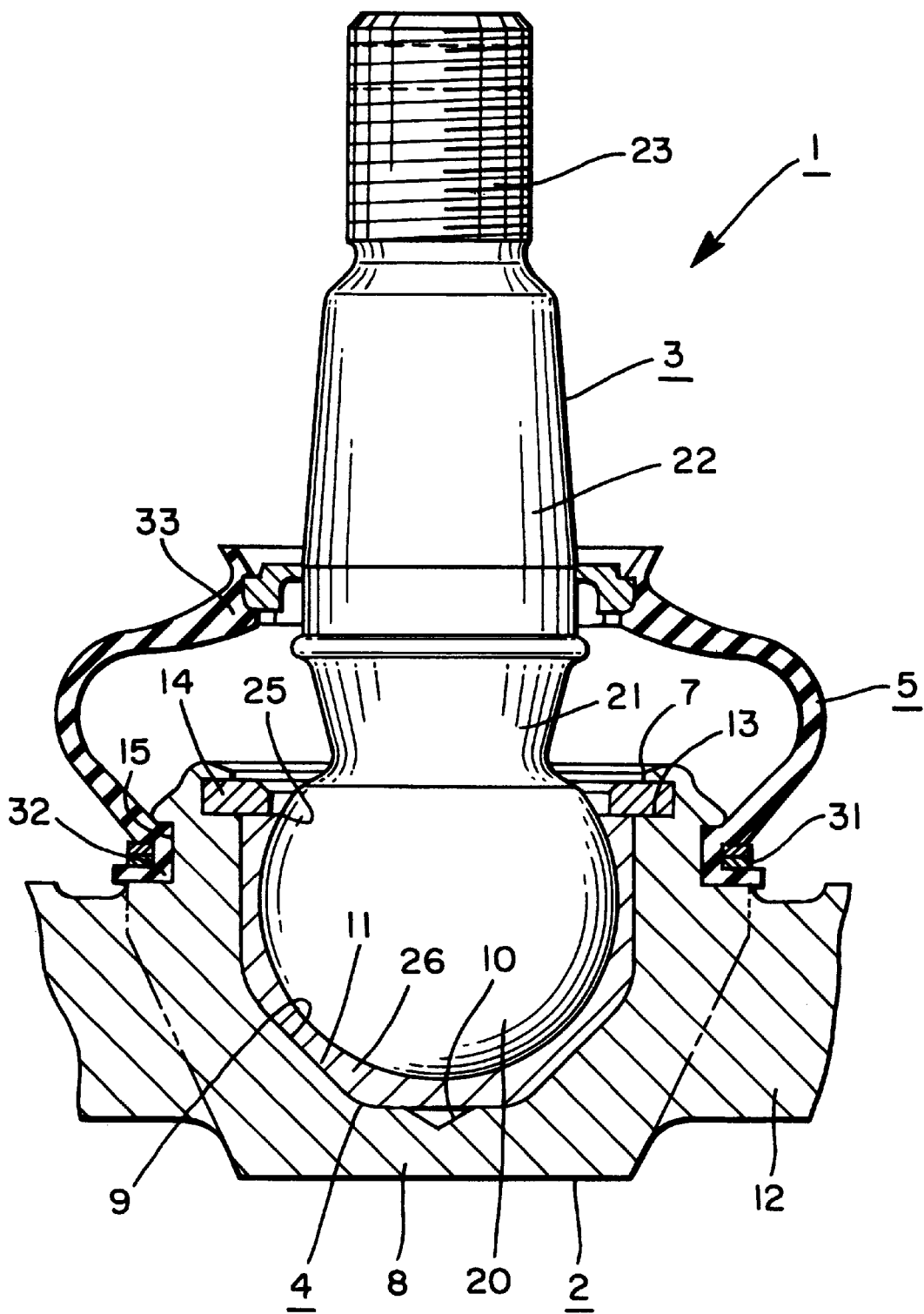
FIG. 2 is a sectional view of the ball joint of FIG. 1.
Figure 3:
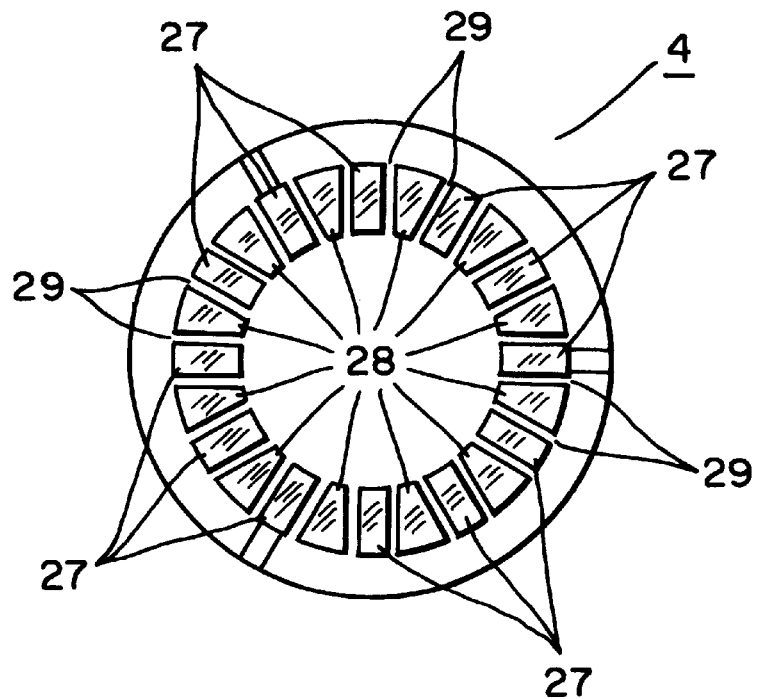
FIG. 3 is a bottom view of a bearing seat of the ball joint of FIG. 1.
Figure 4:
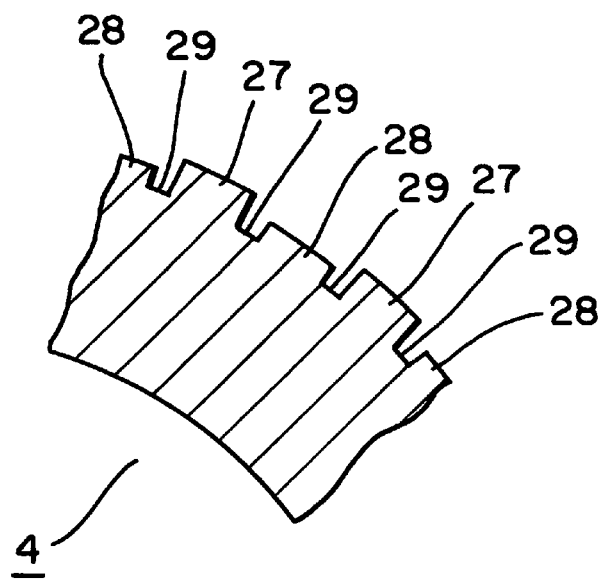
FIG. 4 is a partially cutout sectional view of the bearing seat of the ball joint of FIG. 1.

Referring to FIG. 2, a ball joint 1 includes a metal housing 2 in the shape of a cylinder having a bottom. A bearing seat 4, made of synthetic resin, is fitted into the metal housing 2. The ball joint 1 is adapted for use in a double wishbone type suspension which may be used in the steering system or the suspension mechanism of an automobile.

The housing 2 has an opening 7 leading to an inner chamber 9. Inner chamber 9 has a bottom portion 8 located opposite the opening 7. The inner chamber 9 has a generally cylindrical shape before assembly. A conical face portion 10, centered in the bottom portion 8, is an approximately conical indentation that serves as a lubricant reservoir. A tapered seating face portion 11 that spreads toward the opening 7 from around the conical face portion 10 is an integral, continuous body therewith. An arm portion 12, adapted to be connected to a carrier or the like, is integrally formed on the outer cylindrical surface of the housing 2. A step portion 13, near the inner edge of the opening 7 has an inner diameter greater than that of the inner chamber. A stopper ring 14 is retained in step portion 13 by crimping inward the upper edge of the opening 7. A groove portion 15 is formed around the outer circumferential edge of the housing 2.

A ball stud 3 includes a spherical ball head portion 20, a small diameter portion 21 and a stud portion 22, all integrally formed. The small diameter portion 21 is disposed between the ball head portion 20 and the stud portion 22. An external threaded portion 23 is formed around the outer surface of the end of the stud portion 22. The bearing seat 4 is formed of polyacetal resin or other hard synthetic resin having both rigidity and flexibility. Such a synthetic resin can withstand high loads and exhibits superior bearing characteristics.

Referring now to FIGS. 1 through 4, the bearing seat 4 is retained in the inner chamber 9 of the housing 2 by the stopper ring 14 affixed to the housing 2 to prevent the bearing seat 4 from accidentally slipping out of the housing 2. The bearing seat 4 is formed in a generally cylindrical shape having a closed bottom at one end and an opening at the other end. The opening is an insertion hole 25 to permit the entire ball head portion 20 and a part of the stud portion 22 of the ball stud 3 to be inserted therethrough. The outer surface of the bottom portion 26 of the bearing seat 4, located opposite the insertion hole 25, is tapered at an angle corresponding to angle of the seating face portion 11 of the housing 2.

Load receiving ribs 27 extend outward from the outer surface of the bottom portion 26 to contact the seating face portion 11 of the housing 2. The load receiving ribs 27 are radially arranged at nearly regular intervals with their longitudinal ends aligned in a circle. Auxiliary load receiving ribs 28, disposed between adjacent pairs of load receiving ribs 27, extend a slightly shorter distance outward from the outer surface of the bottom portion 26. That is, the outer surfaces of the load receiving ribs 27, 27, under no-load or light-load conditions extend farther out than the surfaces of auxiliary load receiving ribs 28, and therefore bear the load. The auxiliary load receiving ribs 28 are arranged side by side between adjacent load receiving ribs 27 in such a manner that each auxiliary load receiving rib 28 is separated by a recess 29 from its adjacent load receiving ribs 27.

A cover 5, of a soft material in an approximately cylindrical shape, includes a first ring portion 32 extending around a first end thereof and a second ring portion 33 extending around a second end. The first ring portion 32 is adapted to engage a groove portion 15 of the housing 2. The first ring portion 32 is secured to the housing 2 with a fastening ring 31. The second ring portion 33 is adapted to fit around the stud portion 22 of the ball stud 3. When attached, the cover 5 covers the part of the stud portion 22 of the ball stud 3, which is exposed from the housing 2 to prevent the entry of dirt and other contaminants.

Assembly of the ball joint begins with the ball head portion 20 of the ball stud 3 being forced into the bearing seat 4. The bearing seat 4 and ball head portion 20 assembly is then inserted through the opening 7 of the housing 2 into the inner chamber 9. The assembly is inserted into the inner chamber 9 until the outer faces of the load receiving ribs 27 on the bottom portion 26 of the bearing seat 4 come into contact with the seating face portion 11 of the bottom portion 8 of the housing 2.

Thereafter, the stopper ring 14 is brought into engagement with the step portion 13 of the housing 2 and held in place while the edge of the opening 7 of the housing 2 is crimped inward to prevent the bearing seat 4 from accidentally slipping out of the housing 2. Thus, the ball joint 1 is assembled with the ball head portion 20 of the ball stud 3 slidably enveloped within the bearing seat 4.

With the ball head portion 20 slidably enveloped as described above, the bearing seat 4 applies a pushing energy to the ball head portion 20. The pushing energy is a restoring force resulting from the elasticity and flexure of the bearing seat 4. Flexure occurs in that portion of the bearing seat 4 located between the load receiving ribs 27, 27. Dimensional tolerances of the housing 2, the ball head portion 20 and the bearing seat 4 are absorbed by deformation of the bearing seat 4. Deformation against the elasticity of the bearing seat 4 creates a restoring force which is manifested in a pushing energy applied to the ball head portion 20. Thus due to its elastic nature, this configuration of the bearing seat 4 can absorb the dimensional tolerances of the components.

Maintained pushing energy applied by the elastic restoring force of the bearing seat 4 to the ball head portion 20 provides the ball joint with the feature of friction compensation. Therefore, the embodiment described above compensates for dimensional tolerances in each component while maintaining friction compensation. Thus, lower accuracy requirements for the dimensions of each component are possible, which makes the ball joint easier to produce. Production costs are further reduced by the resulting increase in component yield.

When the ball joint 1 described above is attached to a carrier or the like, a heavy load can be applied to the ball stud 3. The ball stud 3 transfers the applied load to the ball head portion 20, which in turn applies the load to the bearing seat 4. When a heavy load is applied to the bearing seat 4, it works over the tapered surface of the bottom portion 26. As a result, the load receiving ribs 27, 27 arranged on the tapered surface are unable to support the heavy load and are compressed. At the same time, the portions between the respective load receiving ribs 27, 27 are flexibly deformed so that the outer faces of the auxiliary load receiving ribs 28, 28 come into contact with the seating face portion 11 of the housing 2. The auxiliary load receiving ribs 28, 28 contacting the seating face portion 11 contribute to supporting the heavy load, thereby preventing further flexure of the portions between the respective load receiving ribs 27, 27.

Flexure due to a heavy load may be limited by simply increasing the number of the load receiving ribs 27, 27 of the bearing seat in a conventional structure. However, since the load receiving ribs 27, 27 are in contact with the housing 2 from the beginning, merely increasing the number of the load receiving ribs 27, 27 brings about a result similar to that of a ball joint which has a continuous outer surface without load receiving ribs 27. This brings nearly the entire outer surface of the bearing seat in contact with the inner surface of the housing, thereby making it impossible to absorb the dimensional tolerances of the components. In other words, neither a stable torque that permits the ball head portion to slide, nor friction compensation can be achieved.

The embodiment of the invention described above offers stable characteristics through absorption of dimensional tolerances. Furthermore, the embodiment prevents flexure of the bearing seat 4 from generating a great tensile stress on the inner surface of the bearing seat 4 facing the ball head portion 20. The avoidance of excessive flexure prevents fatigue breakage, even when a heavy load is repeatedly applied to the ball joint 1. Thus, the embodiment also increases the load withstanding ability and the durability of the bearing seat 4.

The auxiliary load receiving ribs 28, 28 are radially arranged, alternating with the radially arranged load receiving ribs 27, 27 such that each auxiliary load receiving rib 28 is flanked by two load receiving ribs 27, 27. Therefore, a bearing seat 4 according to the embodiment is produced in a manner similar to the conventional process without the need for changing the production procedure. It is sufficient to slightly modify the mold of a conventional bearing seat 43.

Furthermore, the load receiving ribs 27 and the auxiliary load receiving ribs 28 are not formed as a continuous, integral body but are arranged side by side with a recess 29 therebetween. Therefore, even when a heavy load applied to the ball stud 3 flexes the load receiving ribs 27 in such a manner as to compress the load receiving ribs 27, the flexed portions move to the recesses 29 so that the auxiliary load receiving ribs 28 come into contact with seating face portion 11 of the housing 2 without being affected by the flexure of the load receiving ribs 27. Thus, the external load is supported, while the bearing seat 4 is protected from excessive loading and flexure.

Figure 5:
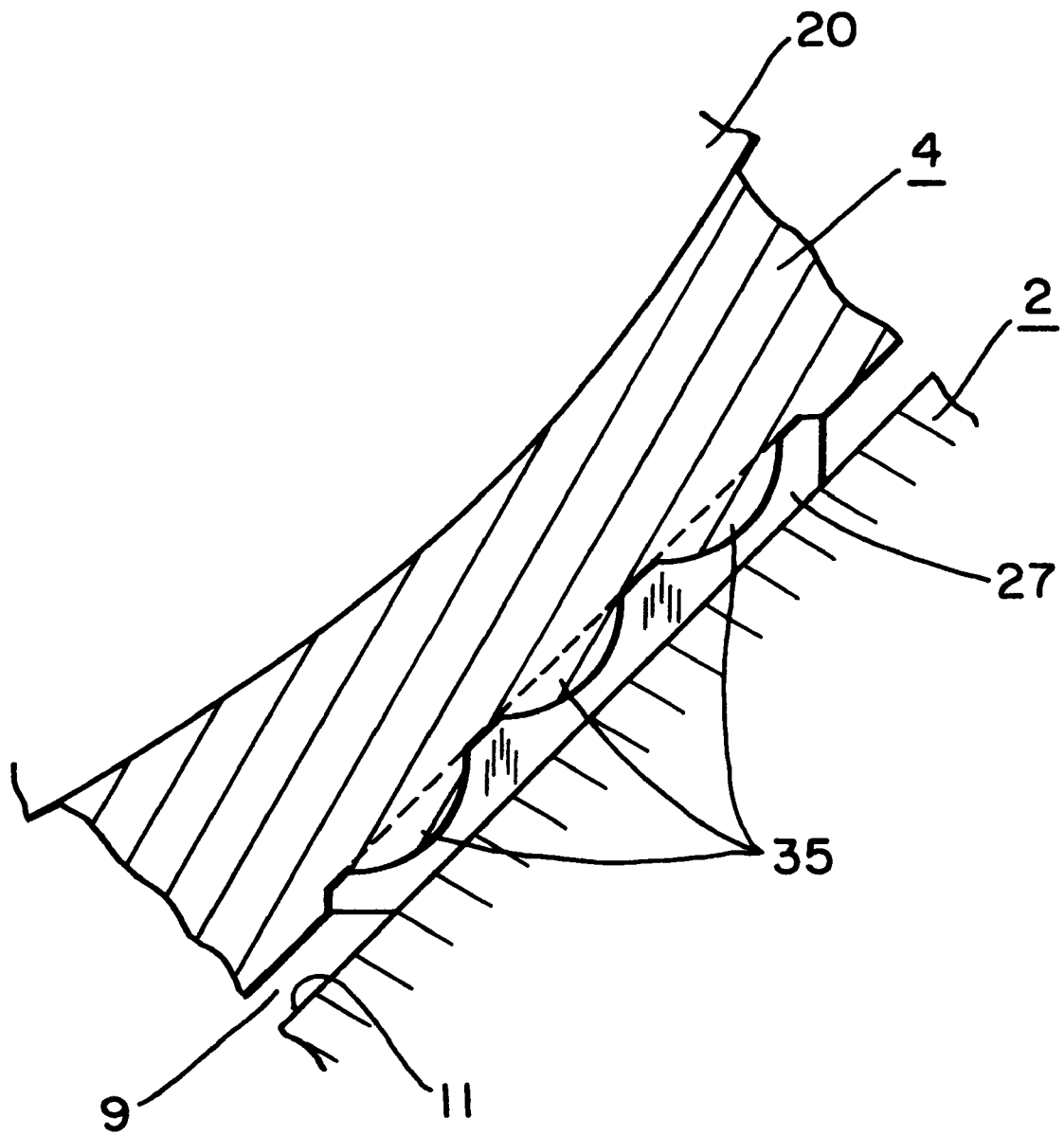
FIG. 5 is a sectional view of the region of the load receiving ribs of a ball joint according to another embodiment of the present invention.
Figure 6:
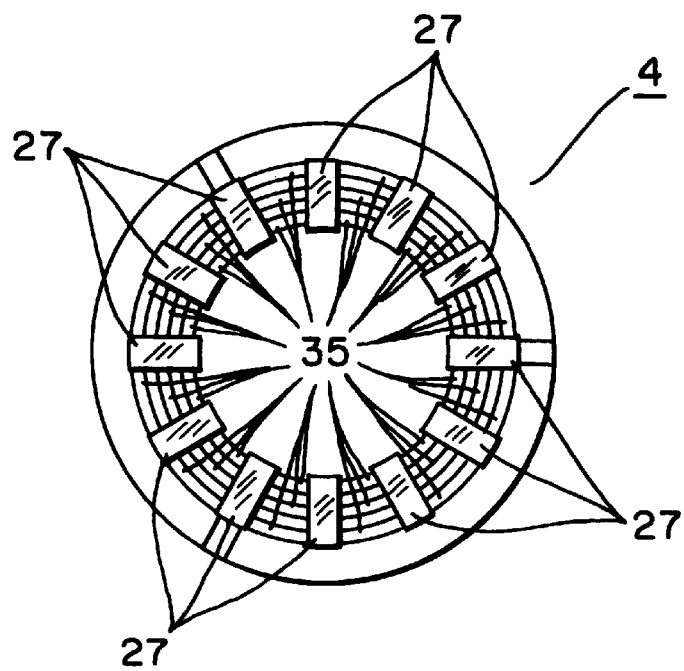
FIG. 6 is a bottom view of a bearing seat of the ball joint of FIG. 5.
Figure 7:
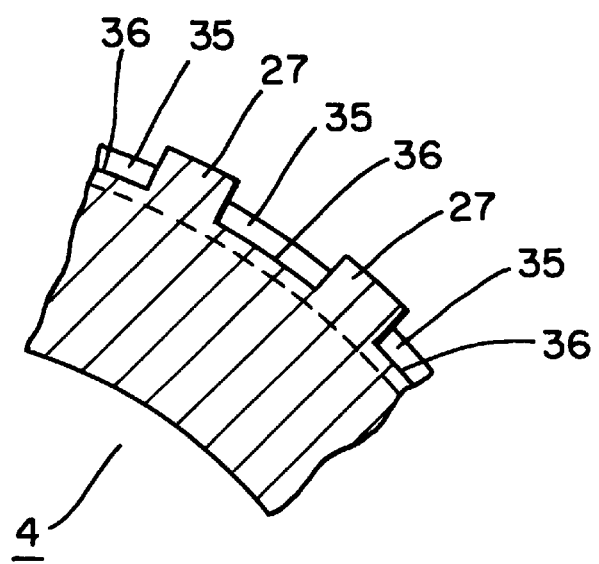
FIG. 7 is a partially cutout sectional view of the bearing seat of the ball joint of FIG. 5.
Figure 8:
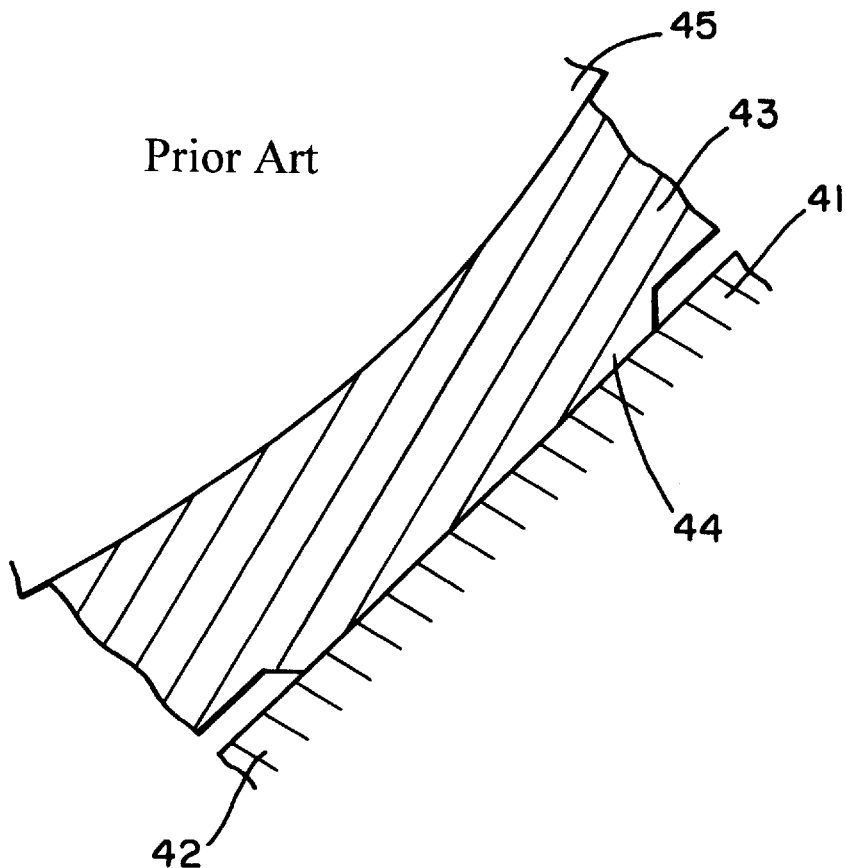
FIG. 8 is a sectional view of the region of the load receiving ribs in an example of prior art ball joints.
Figure 9:
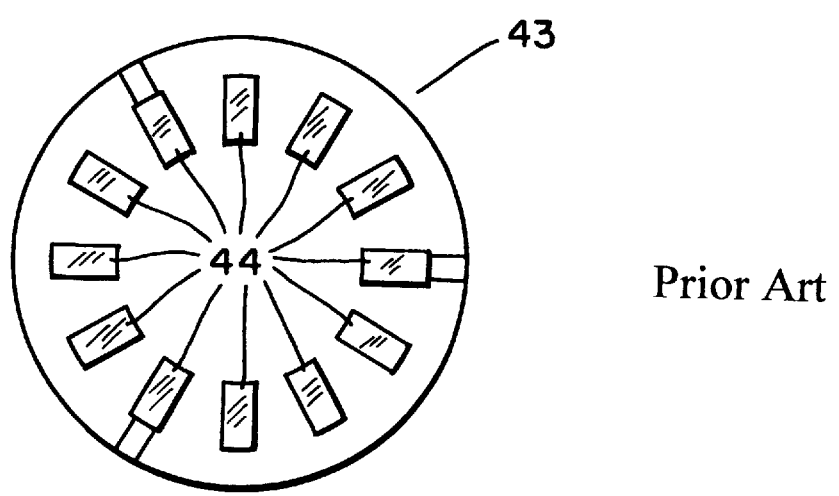
FIG. 9 is a bottom view of the bearing seat of the prior art balljoint of FIG. 8.

Referring now to FIGS. 5 through 7, a second embodiment of the invention shows a configuration that is the same as that of the embodiment shown in FIGS. 1 through 4, except for the arrangement of the auxiliary load receiving ribs 28. In the case of the first embodiment the auxiliary load receiving ribs 28 are arranged radially. The second embodiment has the auxiliary load receiving ribs 35, 35 arranged, for example, in triple concentric circles. Each auxiliary load receiving rib 35 extends in the circumferential direction.

Each auxiliary load receiving rib 35 has a generally semi-circular cross section. The auxiliary load receiving ribs 35, 35 are integrally formed with the load receiving ribs 27, 27 adjacent thereto. The auxiliary load receiving ribs 35, 35 themselves are separated from one another by recesses 36 respectively formed between adjacent auxiliary load receiving ribs 35, 35.

According to the above configuration, a heavy load applied to the ball stud 3 brings the auxiliary load receiving ribs 35, 35 into contact with the seating face portion 11 of the housing 2. The contact surface between the load receiving ribs 27,27 and the auxiliary load receiving ribs 35, 35 thus extends continuously in the circumferential direction. This configuration eliminates the interruption in contact that occurs due to the recesses 29, 29 that are present between the load receiving ribs and the auxiliary load receiving ribs in the embodiment of FIGS. 1–4. The second embodiment is capable of more reliably preventing excessive flexure of the portions between the load receiving ribs 27, 27 since it is thus possible to support a load on an area extending in the circumferential direction.

According to one configuration of the ball joint of the invention, the bearing seat for enveloping the ball head portion of the ball stud includes a plurality of load receiving ribs that are radially arranged on and extend from the outer surface of the bearing seat, i.e. the surface facing the bottom portion of the housing. The bearing seat also includes a plurality of auxiliary load receiving ribs that extend from the outer surface of the bearing seat slightly less farther than the load receiving ribs. The auxiliary load receiving ribs are arranged alternately with the load receiving ribs such that at least one auxiliary load receiving rib is located between each load receiving rib and its adjacent load receiving rib. With the configuration as above, dimensional tolerance of the components can be absorbed by the load receiving ribs, and smooth operation with a stable operation torque is ensured. Furthermore, in cases where a relatively light load is applied to the ball stud, flexure of the portions between the load receiving ribs contributes support for the light load. In cases where a heavy load is applied, the outer faces of the auxiliary load receiving ribs come into contact with the bottom portion of the housing to contribute support for the heavy load. By preventing excessive flexure of the bearing seat, the above configuration prevents fatigue breakage, increases the load withstanding ability and provides stable friction compensation. In addition to the advantages of other configurations, this arrangement allows the auxiliary load receiving ribs to be formed easily using simple conventional production processes.

In another configuration of the ball joint of the invention, each auxiliary load receiving rib extends in the circumferential direction. The surface where the load receiving ribs and the auxiliary load receiving ribs are in contact with the seating face portion extends continuously in the circumferential direction. This arrangement eliminates the gaps that exist between the load receiving ribs in other configurations. Therefore, while having the same effect as that of other configurations, this arrangement is capable of more reliably preventing excessive flexure and fatigue breakage.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A bearing seat comprising:
   an opening and a bottom portion in said bearing seat;
   an outer portion of said bearing seat including a cylindrical portion near said opening at a first end of said bearing seat, and a generally conical portion near said bottom portion of said bearing seat;
   a plurality of load bearing receiving ribs formed on at least an outer surface of said conical portion;
   said plurality of load bearing receiving ribs extending outward a first distance from said outer surface of said conical portion;
   adjacent ones of said plurality of load bearing receiving ribs being spaced a substantial distance apart;
   a plurality of auxiliary load receiving ribs extending outward a second distance from said outer surface of said conical portion;
   each of said auxiliary load receiving ribs being disposed between adjacent ones of said load bearing receiving ribs;
   said second distance being less than said first distance;
   at least one of said auxiliary load receiving ribs is arranged between each adjacent ones of said plurality of load bearing receiving ribs;
   recesses between said load bearing receiving ribs and said auxiliary load receiving ribs do not contact said inner chamber when said ball joint is heavily loaded; and
   said bearing seat being of a material having a resilience sufficient to permit said bearing seat to elastically flex and said load bearing receiving ribs to elastically compress such that said auxiliary load receiving ribs are flexed outward into supportive positions when heavily loaded.

2. A bearing seat according to claim 1 for use in a ball joint comprising:
   a housing having an inner chamber therein;
   an opening leading to said inner chamber in said housing;
   a bottom portion located opposite said opening;
   said bearing seat adapted to be disposed in said inner chamber;
   a ball stud having a ball head portion adapted to be slidably enveloped in said bearing seat;
   said ball stud further including a stud portion integrally formed with said ball head portion; and
   said stud portion projecting from said bearing seat.

3. A bearing seat according to claim 1, wherein at least a second auxiliary load receiving rib is arranged between a pair of adjacent ones of said plurality of load bearing receiving ribs.

4. A bearing seat according to claim 3, wherein said at least one auxiliary load receiving rib and said at least second auxiliary load receiving rib are arranged at different radial distances from a center of said conical portion.

5. A bearing seat comprising:
   an opening and a bottom portion in said bearing seat;
   an outer portion of said bearing seat including a cylindrical portion near said opening at a first end of said bearing seat and a generally conical portion near said bottom portion of said bearing seat;
   a plurality of load bearing receiving ribs arranged circumferentially on at least an outer surface and at a radius from a center of said conical portion;
   said plurality of load bearing receiving ribs extending outward a first distance from said outer surface of said conical portion;
   adjacent ones of said plurality of load bearing receiving ribs being spaced a substantial distance apart;
   a plurality of auxiliary load receiving ribs extending outward a second distance from said outer surface of said conical portion;
   at least one of said auxiliary load receiving ribs is between each adjacent ones of said load bearing receiving ribs in a circumferential pattern;
   said second distance being less than said first distance;
   said at least one of said plurality of auxiliary load receiving ribs includes at least first and second concentric auxiliary load receiving ribs concentric with respect to each other;
   said at least first and second concentric auxiliary load receiving ribs are at different radial distances from said center of said conical portion; and
   said bearing seat being of a material having a resilience sufficient to permit said bearing seat to elastically flex and said load bearing receiving ribs to elastically compress such that said auxiliary load receiving ribs are flexed outward into supportive positions when heavily loaded.

6. A bearing seat according to claim 5, wherein said plurality of auxiliary load receiving ribs are contiguous with said plurality of load bearing receiving ribs.

7. A ball joint comprising:

a housing having an inner chamber therein;

an opening leading to said inner chamber in said housing;

a bottom portion located opposite said opening;

a bearing seat adapted to be disposed in said inner chamber;

an opening and a bottom portion in said bearing seat;

an outer portion of said bearing seat including a cylindrical portion near said opening at a first end of said bearing seat, and a generally conical portion near said bottom portion of said bearing seat;

a plurality of load bearing receiving ribs formed on at least an outer surface of said conical portion;

said plurality of load bearing receiving ribs extending outward a first distance from said outer surface of said conical portion;

adjacent ones of said plurality of load bearing receiving ribs being spaced a substantial distance apart;

a plurality of auxiliary load receiving ribs extending outward a second distance from said outer surface of said conical portion;

each of said auxiliary load receiving ribs being disposed between adjacent ones of said load bearing receiving ribs;

said second distance being less than said first distance;

said plurality of auxiliary load receiving ribs includes at least first and second concentric auxiliary load receiving ribs between adjacent ones of said load bearing receiving ribs and concentric with respect to each other;

said at least first and second concentric auxiliary load receiving ribs are at different radial distances from a center of said conical portion;

recesses between said load bearing receiving ribs and said auxiliary load receiving ribs do not contact said inner chamber when said ball joint is heavily loaded;

said bearing seat being of a material having a resilience sufficient to permit said bearing seat to elastically flex and said load bearing receiving ribs to elastically compress such that said auxiliary load receiving ribs are brought into supportive contact with said inner chamber when heavily loaded;

a ball stud having a ball head portion adapted to be slidably enveloped in said bearing seat;

said ball stud further including a stud portion integrally formed with said ball head portion; and said stud portion projecting from said bearing seat.

8. A ball joint according to claim 7, wherein said at least first and second concentric auxiliary load receiving ribs are contiguous with said plurality of load bearing receiving ribs.

* * * * *